US011292289B2

(12) United States Patent
Vermeulen

(10) Patent No.: US 11,292,289 B2
(45) Date of Patent: Apr. 5, 2022

(54) METHOD OF MANUFACTURING A FLOOR BOARD

(71) Applicant: FLOORING INDUSTRIES LIMITED, SARL, Bertrange (LU)

(72) Inventor: Bruno Vermeulen, Aldeneik-Maaseik (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 0 days.

(21) Appl. No.: 16/356,750

(22) Filed: Mar. 18, 2019

(65) Prior Publication Data

US 2019/0210401 A1 Jul. 11, 2019

Related U.S. Application Data

(63) Continuation of application No. 14/678,653, filed on Apr. 3, 2015, now Pat. No. 10,239,346, which is a (Continued)

(30) Foreign Application Priority Data

Mar. 5, 2010 (EP) .................................... 10155673

(51) Int. Cl.
*B44C 1/22* (2006.01)
*B05D 7/00* (2006.01)
(Continued)

(52) U.S. Cl.
CPC ................ *B44C 1/227* (2013.01); *B05D 1/28* (2013.01); *B05D 3/067* (2013.01); *B05D 3/12* (2013.01); *B05D 5/02* (2013.01); *B05D 7/542* (2013.01); *B44C 1/20* (2013.01); *B44C 5/0476* (2013.01); *B44F 9/02* (2013.01)

(58) Field of Classification Search
None
See application file for complete search history.

(56) References Cited

U.S. PATENT DOCUMENTS 3,083,116 A 3/1963 Berndt et al.
3,440,076 A 4/1969 Vaurio et al.
(Continued)

FOREIGN PATENT DOCUMENTS

DE 2334734 B1 6/1974
DE 3249919 C2 7/1991
(Continued)

OTHER PUBLICATIONS

International Search Report and Written Opinion for International application No. PCT/EP2011/053383.
(Continued)

*Primary Examiner* — Allan W. Olsen
(74) *Attorney, Agent, or Firm* — Workman Nydegger

(57) ABSTRACT

A method of manufacturing a floor board comprises the steps of supplying a panel, printing a curable substance or surface removing substance onto the panel in a predefined pattern for creating an elevation on the panel at the pattern or removing a portion of the surface of the panel at the pattern, respectively, and curing the curable substance or removing any reaction products of the surface removing substance and the panel.

7 Claims, 1 Drawing Sheet

Related U.S. Application Data continuation of application No. 13/581,738, filed as application No. PCT/EP2011/053383 on Mar. 7, 2011, now abandoned.

(51) Int. Cl.

| | |
|---|---|
| ***B05D 5/02*** | (2006.01) |
| ***B44F 9/02*** | (2006.01) |
| ***B05D 1/28*** | (2006.01) |
| ***B05D 3/06*** | (2006.01) |
| ***B05D 3/12*** | (2006.01) |
| ***B44C 5/04*** | (2006.01) |
| ***B44C 1/20*** | (2006.01) |

(56) References Cited

U.S. PATENT DOCUMENTS 3,446,184 A 5/1969 Johnson
3,545,997 A 12/1970 Hochberg
3,648,358 A 3/1972 Cannady, Jr. et al.
3,963,338 A * 6/1976 Altman .................... B41M 3/00 353/120
4,227,200 A 10/1980 Mansukhani
4,312,268 A 1/1982 King et al.
4,504,523 A 3/1985 Miller, Jr. et al.
4,689,259 A 8/1987 Miller, Jr. et al.
4,796,402 A 1/1989 Pajala
4,833,530 A 5/1989 Kohashi
4,880,689 A 11/1989 Park et al.
4,943,816 A * 7/1990 Sporer ................... G03G 17/00 346/25
5,204,055 A 4/1993 Sachs et al.
5,498,466 A 3/1996 Navarro et al.
5,565,246 A 10/1996 Hyde
5,594,484 A 1/1997 Furukawa
5,627,578 A 5/1997 Weintraub
5,778,789 A 7/1998 Krishnan et al.
6,387,457 B1 5/2002 Jiang et al.
6,394,595 B1 5/2002 Jiang et al.
6,402,317 B2 6/2002 Yanagawa et al.
6,422,696 B1 7/2002 Takahashi et al.
6,439,713 B1 8/2002 Noguchi et al.
6,465,046 B1 10/2002 Hansson et al.
6,579,616 B1 6/2003 Beckman et al.
7,357,959 B2 4/2008 Bauer
7,383,768 B2 6/2008 Reichwein et al.
7,632,561 B2 12/2009 Thiers
7,691,451 B2 4/2010 Ohkoshi et al.
7,891,799 B2 2/2011 Edwards et al.
8,067,618 B2 11/2011 Lautensack et al.
8,114,513 B2 2/2012 Rentschler et al.
8,192,010 B2 6/2012 Edwards et al.
8,273,659 B2 * 9/2012 Lennon ........... H01L 31/022425 438/689
8,317,311 B2 11/2012 Edwards et al.
8,337,947 B2 12/2012 Camorani
8,361,597 B2 1/2013 Shiao et al.
8,430,498 B2 4/2013 Edwards et al.
8,431,054 B2 4/2013 Pervan et al.
8,465,804 B2 6/2013 Provoost et al.
8,740,367 B2 6/2014 Edwards et al.
8,814,346 B2 8/2014 Edwards et al.
9,079,212 B2 7/2015 Pervan et al.
9,266,382 B2 2/2016 Schacht et al.
9,352,499 B2 5/2016 Ziegler et al.
9,371,456 B2 6/2016 Pervan et al.
9,528,011 B2 12/2016 Pervan et al.
9,630,404 B2 4/2017 Pervan et al.
9,670,371 B2 6/2017 Pervan et al.
9,738,095 B2 8/2017 Pervan et al.
9,873,803 B2 1/2018 Pervan et al.
10,029,484 B2 7/2018 Pervan et al.
2001/0005542 A1 6/2001 Graab et al.
2001/0022607 A1 9/2001 Takahashi et al.
2002/0149137 A1 10/2002 Jang et al.
2003/0072919 A1 * 4/2003 Watts, Jr. .................. B32B 3/00 428/159
2003/0108718 A1 6/2003 Simon et al.
2003/0167717 A1 9/2003 Garcia
2004/0101619 A1 * 5/2004 Camorani ................. B44C 1/16 427/180
2004/0142107 A1 7/2004 Eriksson et al.
2004/0153204 A1 8/2004 Blanco
2004/0177788 A1 9/2004 Rick et al.
2004/0217186 A1 11/2004 Sachs et al.
2004/0239003 A1 * 12/2004 Espe ..................... B30B 15/065 264/284
2004/0266207 A1 * 12/2004 Sirringhauss ....... H01L 51/0023 438/725
2005/0013932 A1 1/2005 Dennis et al.
2005/0128274 A1 6/2005 Matsushima et al.
2005/0176321 A1 8/2005 Crette et al.
2005/0249923 A1 11/2005 Reichwein et al.
2006/0156672 A1 * 7/2006 Laurent ............. E04F 15/02033 52/589.1
2006/0188670 A1 8/2006 Kojima et al.
2006/0246266 A1 11/2006 Hall
2006/0264544 A1 11/2006 Lustiger et al.
2007/0049047 A1 3/2007 Fujimoto et al.
2007/0076069 A1 4/2007 Edwards et al.
2007/0091160 A1 4/2007 Kis et al.
2007/0107344 A1 5/2007 Kornfalt et al.
2007/0134825 A1 * 6/2007 Zou ..................... H01L 51/0019 438/18
2007/0193174 A1 8/2007 Vogel et al.
2007/0209736 A1 9/2007 Deringor et al.
2007/0224438 A1 9/2007 Van Benthem et al.
2007/0240585 A1 10/2007 Vaish et al.
2007/0283648 A1 12/2007 Chen
2007/0299196 A1 12/2007 Ohkoshi et al.
2008/0010924 A1 1/2008 Pietruczynik et al.
2008/0081862 A1 4/2008 Lustiger et al.
2008/0185092 A1 8/2008 Blenkhorn
2008/0224332 A1 * 9/2008 Tam ........................ H01L 22/34 257/786
2008/0241472 A1 10/2008 Shiao et al.
2008/0261003 A1 10/2008 Lewis et al.
2009/0010682 A1 1/2009 Camorani
2009/0031662 A1 2/2009 Chen et al.
2009/0042346 A1 * 2/2009 Kugler ................ H01L 51/0529 438/197
2009/0047480 A1 2/2009 Juers et al.
2009/0116966 A1 5/2009 Althoff et al.
2009/0155612 A1 * 6/2009 Pervan .................... E04F 15/02 428/498
2009/0171101 A1 7/2009 Lautensack et al.
2009/0232969 A1 * 9/2009 Hayton ................. H01L 21/288 427/58
2009/0252925 A1 * 10/2009 Provoost ................... B44F 9/02 428/151
2009/0283141 A1 * 11/2009 Bentzen ............ H01L 31/02167 136/256
2010/0032011 A1 * 2/2010 Sauar .............. H01L 31/022441 136/256
2010/0192793 A1 * 8/2010 Verhaeghe ................ B44C 1/24 101/492
2010/0196678 A1 8/2010 Vermeulen
2010/0260969 A1 * 10/2010 Vermeulen ................ B44C 5/04 428/141
2010/0300020 A1 12/2010 Vermeulen
2010/0300030 A1 * 12/2010 Pervan ...................... B32B 5/26 52/588.1
2011/0024938 A1 2/2011 Tripp et al.
2011/0097506 A1 4/2011 Shah et al.
2011/0129640 A1 6/2011 Beall et al.
2011/0141189 A1 6/2011 Edwards et al.
2011/0169888 A1 6/2011 Edwards et al.
2011/0167744 A1 * 7/2011 Whispell ........... E04F 15/02005 52/309.1
2011/0171412 A1 7/2011 Dohring
2011/0189471 A1 8/2011 Ziegler et al.
2011/0237739 A1 9/2011 Tada et al.

(56) References Cited

U.S. PATENT DOCUMENTS

| | | | |
|---|---|---|---|
| 2011/0247748 A1 | 10/2011 | Pervan et al. | |
| 2011/0250404 A1 | 10/2011 | Pervan et al. | |
| 2011/0261464 A1 | 10/2011 | Hoffman et al. | |
| 2011/0262720 A1 | 10/2011 | Riebel et al. | |
| 2011/0268937 A1 | 11/2011 | Schacht et al. | |
| 2011/0315186 A1* | 12/2011 | Gee | H01L 31/1892 136/244 |
| 2012/0015107 A1* | 1/2012 | Schacht | B44C 5/043 427/261 |
| 2012/0052250 A1* | 3/2012 | DeRosa | B01L 3/502707 428/172 |
| 2012/0105534 A1* | 5/2012 | Boday | B33Y 70/00 347/20 |
| 2012/0164780 A1* | 6/2012 | Brunton | H01L 31/1804 438/71 |
| 2012/0176443 A1 | 7/2012 | Robertson et al. | |
| 2012/0196081 A1 | 8/2012 | Gleich et al. | |
| 2012/0244317 A1 | 9/2012 | Edwards et al. | |
| 2012/0264853 A1 | 10/2012 | Ziegler et al. | |
| 2013/0025216 A1* | 1/2013 | Reichwein | B29C 59/026 52/105 |
| 2013/0043211 A1 | 2/2013 | Vermeulen | |
| 2013/0108873 A1 | 5/2013 | Shiao et al. | |
| 2013/0170218 A1 | 7/2013 | Wolk et al. | |
| 2013/0242016 A1 | 9/2013 | Edwards et al. | |
| 2014/0017452 A1* | 1/2014 | Pervan | E04F 15/042 428/172 |
| 2014/0023832 A1* | 1/2014 | Pervan | E04F 15/02161 428/173 |
| 2014/0028772 A1 | 1/2014 | Pervan | |
| 2014/0196618 A1 | 7/2014 | Pervan et al. | |
| 2014/0198168 A1 | 7/2014 | Pervan et al. | |
| 2014/0198170 A1 | 7/2014 | Pervan et al. | |
| 2014/0199495 A1 | 7/2014 | Pervan et al. | |
| 2014/0199513 A1 | 7/2014 | Pervan et al. | |
| 2014/0199531 A1 | 7/2014 | Pervan et al. | |
| 2014/0220318 A1 | 8/2014 | Pervan | |
| 2015/0030817 A1 | 1/2015 | Wiegelmann et al. | |
| 2015/0239230 A1 | 8/2015 | Vermeulen | |
| 2015/0274997 A1 | 10/2015 | Pervan et al. | |
| 2015/0298492 A1 | 10/2015 | Palumbo | |
| 2015/0328919 A1 | 11/2015 | Vermeulen | |
| 2016/0068010 A9 | 3/2016 | Vermeulen | |
| 2016/0114619 A1 | 4/2016 | Schacht et al. | |
| 2016/0144612 A1 | 5/2016 | Pervan et al. | |
| 2016/0208116 A1 | 7/2016 | Pervan et al. | |
| 2016/0250853 A1 | 9/2016 | Pervan et al. | |
| 2016/0368180 A1 | 12/2016 | Ziegler et al. | |
| 2017/0066255 A1 | 3/2017 | Pervan et al. | |
| 2017/0204281 A1 | 7/2017 | Pervan et al. | |
| 2017/0232761 A1 | 8/2017 | Pervan et al. | |
| 2017/0348984 A1 | 12/2017 | Pervan et al. | |
| 2018/0111390 A1 | 4/2018 | Pervan et al. | |
| 2018/0127605 A1 | 5/2018 | Pervan et al. | |
| 2018/0171637 A1 | 6/2018 | Shiao et al. | |
| 2018/0298216 A1 | 10/2018 | Pervan et al. | |

FOREIGN PATENT DOCUMENTS

| | | | | |
|---|---|---|---|---|
| DE | 202004018710 | | 3/2005 | |
| DE | 102007019871 | A1 | 10/2008 | |
| EP | 0403264 | A2 | 12/1990 | |
| EP | 0657309 | A1 | 6/1995 | |
| EP | 0769535 | A2 | 4/1997 | |
| EP | 1020765 | A1 | 7/2000 | |
| EP | 1209199 | A1 | 5/2002 | |
| EP | 1584378 | A1 | 10/2005 | |
| EP | 2108524 | A1 | 10/2009 | |
| EP | 2110267 | A2 | 10/2009 | |
| EP | 2213476 | A1 | 8/2010 | |
| EP | 2363288 | A1 | 9/2011 | |
| EP | 2363299 | A1 | 9/2011 | |
| EP | 2542426 | A1 | 1/2013 | |
| GB | 1215551 | A | 12/1970 | |
| GB | 2065556 | A | 7/1981 | |
| GB | 2128898 | A | 5/1984 | |
| GB | 2419110 | A | 4/2006 | |
| JP | 2001311254 | A | 11/2001 | |
| JP | 2005097339 | A | 4/2005 | |
| JP | 2008156573 | A | 7/2008 | |
| JP | 2008265229 | A | 11/2008 | |
| JP | 2009173003 | A | 8/2009 | |
| JP | 2010209325 | A | 9/2010 | |
| JP | 6287467 | B2 | 3/2018 | |
| KR | 20090112326 | A | 10/2009 | |
| WO | 9015673 | A1 | 12/1990 | |
| WO | 9845129 | A1 | 10/1998 | |
| WO | 0172489 | A2 | 10/2001 | |
| WO | 0242373 | A1 | 5/2002 | |
| WO | 03057488 | A1 | 7/2003 | |
| WO | 2005097874 | A2 | 10/2005 | |
| WO | 2005120847 | A1 | 12/2005 | |
| WO | 2006057241 | A1 | 6/2006 | |
| WO | 2006125036 | A2 | 11/2006 | |
| WO | 2007033031 | A2 | 3/2007 | |
| WO | 2007060298 | A1 | 5/2007 | |
| WO | 2007096746 | A2 | 8/2007 | |
| WO | 2007125096 | A1 | 11/2007 | |
| WO | 2008042088 | A1 | 4/2008 | |
| WO | 2008121749 | A1 | 10/2008 | |
| WO | 2009030935 | A2 | 3/2009 | |
| WO | 2009065769 | A2 | 5/2009 | |
| WO | 2009074174 | A1 | 6/2009 | |
| WO | 2010070485 | A2 | 6/2010 | |
| WO | WO-2010147512 | A2 * | 12/2010 | C23F 1/08 |
| WO | 2011064075 | A2 | 6/2011 | |
| WO | 2011107610 | A1 | 9/2011 | |
| WO | 2011129757 | A1 | 10/2011 | |
| WO | 2012007230 | A1 | 1/2012 | |
| WO | 2012141651 | A1 | 10/2012 | |
| WO | 2014037823 | A1 | 3/2014 | |

OTHER PUBLICATIONS

Canadian Office Action dated Sep. 25, 2018, for corresponding Canadian Patent Application No. 2984272, filed Sep. 9, 2011.

Canadian Office Action dated Sep. 25, 2018, for corresponding Canadian Patent Application No. 2791216, filed Dec. 15, 2016.

Odian, George, "Principles of Polymerization" 1991, 3rd Edition, 5 pages incl. pp 122-123, John Wiley & Sons, Inc., New York, NY.

Hudd, "Chapter 1: Inkjet Printing Technologies," Chemistry of Inkjet Inks, 2010, pp. 3-18, World Scientific Publishing Co. PTE. Ltd., Published in Singapore and Hackensack NJ.

Owens, James C. "A Tutorial on Printing," Imaging.org Resources, 2010 pp. 1-5, Society for Imaging Sciences and Technology, retrieved Jul. 27, 2015 from http://web.archive.org/web/20100706153535/http://www.imaging.org/ist/resources/tutorial.

Pervan, Darko, Technical Disclosure entitled "Digital Printing and Embossing" IP.com No. IPCOM000224950D, IP.com PriorArtDatabase, Jan. 15, 2013.

International Search Report issued in PCT/SE2014/050022, dated May 26, 2014.

Pervan, Darko, Technical Disclosure entitled "Digital Overlay" IP.com No. IPCOM000225271, IP.com PriorArtDatabase, Feb. 5, 2013.

* cited by examiner

METHOD OF MANUFACTURING A FLOOR BOARD

CROSS-REFERENCE TO RELATED APPLICATION

This application is a continuation and claims priority under 35 USC 120 of U.S. Ser. No. 14/678,653 filed Apr. 3, 2015, which claims priority of U.S. Ser. No. 13/581,738 filed Aug. 29, 2012, which is a Section 371 National Stage Application of International Application PCT/EP2011/053383 filed Mar. 7, 2011 and published as WO/2011/107610 A1 in English, all of which are incorporated herein in their entirety.

BACKGROUND

The discussion below is merely provided for general background information and is not intended to be used as an aid in determining the scope of the claimed subject matter.

Aspects of the invention relate to a method of manufacturing a floor board.

In the field of the flooring industry, like in several other industries, there is a trend to mass customization. This means that there is a demand for products that suit to specific customers. As a consequence, a high degree of flexibility in production processes is required.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A method of manufacturing a floor panel according to an aspect of the invention, which comprises supplying a panel, printing a curable substance or surface removing substance onto the panel in a predefined pattern for creating an elevation on the panel at the pattern or removing a portion of the surface of the panel at the pattern, respectively, and curing the curable substance or removing any reaction products of the surface removing substance and the panel, hence forming the floor board.

Due to the method it is not necessary to use relatively expensive embossed press plates or press rollers to be pressed under high pressure on the panel in order to create an embossed surface of the floor board. Furthermore, the method provides the opportunity to create a high degree of variations in relief patterns of floor boards. A comparable degree of variation in case of using different embossed press plates or press rollers would be more expensive.

In an embodiment the step of printing is digitally controlled and/or non-contact printing and/or non-contact printing. Due to the digitally controlled step a quick switch to manufacturing floor boards having alternative relief patterns can be effected. This introduces a great flexibility in relief patterns and avoids the necessity of repetitive embossment such as in case of prior art relief press rollers or relief press plates. This means that a standardized basic product can be efficiently further treated to form a unique product corresponding to individual customer desires. More specifically, it is possible that the substance is printed onto the panel via a digitally controlled printing nozzle.

Nevertheless, it is also conceivable to print the curable substance or surface removing substance onto the panel through roller printing or an alternative prior art printing method. In order to change the pattern to be printed a plurality of printing rollers having different patterns can be used. For example, they may be revolver-mounted in order to be able to quickly change to a different pattern to be printed onto the panel.

The panel may comprise a substrate of HDF, WPC (Wood Plastic Composite), polymeric composite (engineered polymer), PVC, LVT (Luxury Vinyl Tile) or the like. The panel may be provided with a decorative basic pattern, which is directly printed on the substrate or laminated thereon by means of a known method of laminating. Furthermore, the supplied panel may already comprise an embossment, but may also have a flat surface on which the curable substance or the surface removing substance is printed. The curable substance may be cured by curing means, for example by means of UV radiation or a UV laser. Alternative curing means may comprise electron-beam heating, or normal heating at elevated temperature; for example, the entire panel including the curable substance may be placed in a heated environment so as to cure the substance.

The curable substance may comprise wear resistant particles in order to provide good wear performance of the elevated portions of the floor board in use.

In a specific embodiment the predefined pattern substantially corresponds to a decorative basic pattern being present on the panel. This means that the floor board will be provided with embossment in register. In practice, the pattern may be a wood grain pattern where the wood grains are depressed portions and the surrounding portions are elevated portions. The depressed portions can be made by printing a surface removing substance at the intended depressed portions or printing a curable substance beside of the intended depressed portions.

The curable substance or surface removing substance may be printed onto the panel by first printing a liquid onto the panel in said predefined pattern, and then providing an intermediate substance to the liquid, wherein the intermediate substance or the liquid together with the intermediate substance form the curable substance or surface removing substance. In practice, the intermediate substance may comprise a powder. This can be applied onto the liquid and stick to the liquid, whereas abundant powder is removed, for example by a suction device. In one embodiment, the intermediate substance contains wear resistant particles since this provides the opportunity to print the liquid without wear resistant particles onto the panel so as to avoid wear of a printing head, whereas the powder including wear resistant particles can be applied less accurate to the printed liquid.

In practice the maximal thickness of the curable substance lies between 50 and 250 μm, but a thinner or thicker layer is conceivable. Preferably, the maximal thickness lies between 5 and 1000 μm.

The curable substance may contain a varnish, which is lustrous or matte, for example.

It is also possible that the panel is a flexible sheet which is laminated to a substrate after printing the curable substance or surface removing substance thereon so as to form the floor board. For example, the sheet is a paper sheet which is already provided with a resin or still has to be provided with a resin.

In an alternative embodiment the method comprises the steps of supplying a panel, applying a curable substance or surface removing substance onto the panel in a predefined pattern for creating an elevation on the panel at the pattern or removing a portion of the surface of the panel at the pattern, respectively, wherein the substance is applied onto the panel by first putting a layer of the substance onto the panel and then creating the predefined pattern by a digitally controlled impacting member which is pressed into said substance and movable in a plane extending parallel to the panel so as to form the pattern, curing the curable substance or removing any reaction products of the surface removing substance and the panel, hence forming the floor board. The advantage of the method is that using expensive prior art embossed press plates is not necessary to create embossed floor boards, whereas quick changes to the desired relief pattern can be achieved.

In practice the impacting member will be smaller than the dimensions of the panel. The impacting member may be comparable to a conventional dot matrix printer, in which digitally controlled pins impact on a paper via an ink ribbon. This method is applicable in case of partly cured top layers, such as polyurethane (PU) hot coating top layers. The control of the impacting member can be based on image recognition, for example cameras that recognize the pattern of approaching panels.

BRIEF DESCRIPTION OF THE DRAWINGS

Aspects of the invention will be explained in more detail hereinafter with reference to drawings, which are very schematic representations of embodiments of the invention.

DETAILED DESCRIPTION OF THE ILLUSTRATIVE EMBODIMENT

Figure 1:
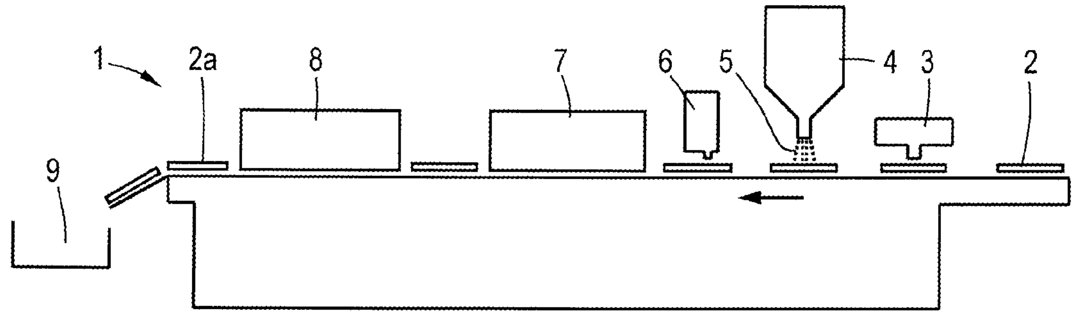
FIG. 1 is a schematic side view of an apparatus for performing an embodiment of the method.

FIG. 1 illustrates the main steps of an embodiment of the method. The manufacturing process performed by an apparatus 1 runs from the right to the left in FIG. 1. In this case a panel 2 is transported first to a digital printing station 3. At the digital printing station 3 a liquid is printed on an upper surface of the panel 2 in a predetermined pattern. The liquid may be an ink or varnish, being transparent or colored or any other liquid material.

Then, the printed panel 2 is transported to a powder unit 4, where an intermediate substance or a powder 5 is spread over the panel 2. The powder 5 will stick to the liquid. The liquid and the powder 5 form a substance which is curable. A part of the powder 5 may fall beside of the printed pattern or on a portion of the printed pattern which is already dry. That part of the powder 5 will be removed from the panel 2 by a suction device 6, but an alternative powder removing device is conceivable.

In a subsequent step the formed substance on the panel 2 is cured at a heating station 7. Before storing the resulting floor boards 2*a* at a storage station 9 the panels 2 may be cooled at a cooling station 8. In the heating station 7 the powder may be melted together into a single mass which is elevated above the initial upper surface of the panel 2. It is conceivable that the liquid and powder together form a curable substance or the powder itself forms a curable substance adhering to the panel 2 upon curing.

It is also conceivable that the powder forms the curable substance whereas the liquid pattern only functions as a temporary carrier for carrying the powder in the desired pattern. In this case the liquid may partly or fully disappear during the step of heating, for example by evaporation.

The powder 5 may be a swelling powder such that upon curing the volume of the substance becomes larger (and the elevations higher) than that of the sum of the liquid and the powder 5 separately. In practice, the maximal thickness of the substance after curing lies between 50 and 250 μm, but a higher or lower thickness is conceivable. In practice, a thickness of 5-1000 μm is preferred.

Furthermore, the powder 5 can also contain wear-resistant particles, for example corundum particles. It is advantageous that in the embodiment as illustrated in FIG. 1 the wear resistant particles are supplied separately from a printing head of the digital printing station, thus avoiding wear of the printing head through the presence of wear resistant particles.

Due to curing of the mixture of the liquid and the powder 5 or the powder 5 alone a solid elevated region arises on the panel 2 at the location where the liquid pattern was printed. The pattern may represent a real wood pattern or the like. The heating station 7 may comprise a UV-laser, for example, but alternative curing means are conceivable.

The apparatus of FIG. 1 may comprise a camera (not shown) for recognizing a basic pattern being printed on the panel 2 before arriving at the digital printing station 3. The pattern to be printed on the panel 2 at the digital printing station 3 may correspond to the basic pattern such that the panel 2 obtains an embossment in register.

Several types, shapes and dimensions of the powder 5 are conceivable. For example, metallic resin powder which creates a metallic effect after melting, lustrous resin powder in which lustrous particle are added to the powder, anti-static powder which avoids build-up of electrostatic charge, and powders which generate pearlescent effect, matt effect, or odour effect.

Figure 2:
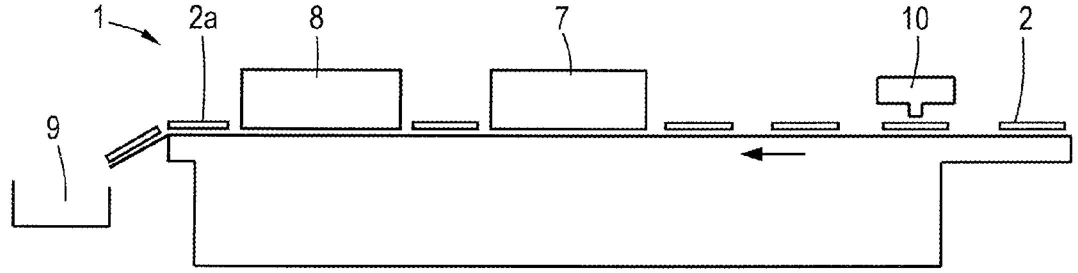
FIG. 2 is a similar view as FIG. 1 of an alternative embodiment.

In an alternative embodiment the curable substance is directly printed at the printing station 10 in a predetermined pattern on a panel 2. This is illustrated in FIG. 2. In this case, a relatively large amount of substance has to be printed by the printing station 10. Other features as described in relation to the embodiment as illustrated in FIG. 1 are also applicable to the embodiment as illustrated in FIG. 2.

Figure 3:
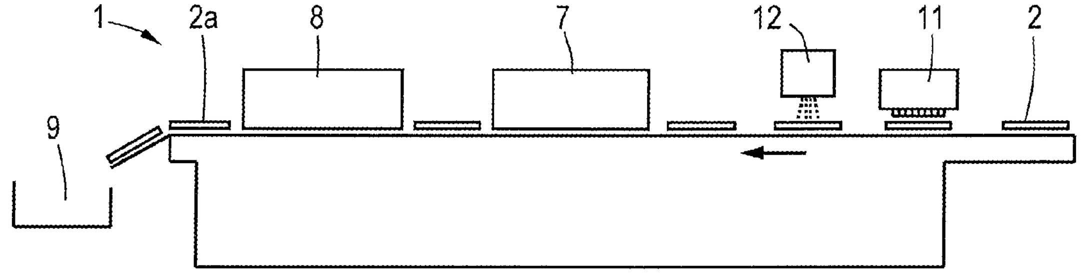
FIG. 3 is a similar view as FIG. 1 of another alternative embodiment.

In a further alternative embodiment of the method a layer of the substance is spread onto the panel 2 at a substance spread device 11 and then the predetermined relief pattern is created by a digitally controlled impacting member 12, see FIG. 3. In this case the substance may be spread uniformly over the panel 2. The digitally controlled impacting member 12 is repeatably pressed into the curable substance and movable in a plane extending parallel to the panel 2 so as to form the relief pattern. Other features as described in relation to the embodiment as illustrated in FIG. 1 are also applicable to the embodiment as illustrated in FIG. 3.

Instead of locally displacing the substance by an impacting member 12 it is also conceivable to remove the substance locally from the panel, for example by a suction device.

In another alternative method a surface removing substance can be applied on the panel (directly or indirectly via powder in a printed liquid as described hereinbefore) such that the local surface of the panel 2 at the intended pattern is removed. The substance can be applied on the panel in a manner as illustrated in FIGS. 1 and 2. The substance is selected such that it reacts with the surface of the panel 2 so as to remove a portion thereof. Contrary to the embodiments as described above the relief pattern of the panel 2 is formed by removing material from the panel 2 instead of adding material. After heating and/or cooling of the substrate on the panel any reaction products may be removed by pressed air, for example. It is also possible that neither heating nor cooling is necessary in this embodiment. After applying the embossment in this way the panel may be covered with a finishing layer containing wear resistant particles.

Alternatively, the surface removing substance is selected such that it reacts with the surface of the panel 2 after being activated. For example, the substance can be activated by a heat source, UV radiation, a laser beam or the like. When the surface removing substance is printed in a predefined pattern onto the panel 2, an activation device needs not to be focused very accurately on specific areas of the panel surface since only those areas will be activated where the substance is present. After activation and reaction of the substance with the panel surface, any reaction products may be removed.

Panels having the same decorative basic pattern may be provided with different relief patterns, for example one of the type embossing-in-register and the other one of the type brushed all-over. This enlarges the variation of appearances of floor boards.

The panel 2 on which the curable substance or surface removing surface is applied, may be made of HDF, WPC, polymer composite or engineered polymer, LVT, PVC or the like. It is noted that the method can also be applied on a flexible sheet which will be laminated to a substrate at a later stage so as to form a floor board.

The invention is not limited to the embodiments shown in the figures, which can be varied in several ways within the scope of the invention. It is for example possible that the method is applied on alternative substrates than on a panel or a sheet, for example on the packaging material of floor panels. Furthermore, the digital printing station may be replaced by alternative printing means, for example a conventional printing roller as known from the prior art roller printing process.

What is claimed is:

1. A method of manufacturing a floor board, comprising:

supplying a panel; wherein said panel comprises a substrate and a decorative basic panel that is directly printed on the substrate or laminated thereon;

printing a surface removing substance onto a surface of the panel in a predefined pattern for removing a portion of the surface of the panel at the predefined pattern, wherein the predefined pattern substantially corresponds to the decorative basic pattern being present on the panel, and wherein the step of printing is digitally controlled; and removing any reaction products of the surface removing substance and the panel.

2. The method according to claim 1, wherein the surface removing substance is printed onto the panel by first printing a liquid onto the panel in said predefined pattern, and then providing an intermediate substance to the liquid, wherein the intermediate substance or the liquid together with the intermediate substance form the surface removing substance.

3. The method according to claim 2, wherein the intermediate substance comprises a powder.

4. The method according to claim 1, wherein the panel is a flexible sheet, the method further comprising, after printing the surface removing substance onto the surface of the panel, laminating the substrate to the panel so as to form the floor board.

5. The method according to claim 1, wherein the surface removing substance is activated by an activation device for reaction of the surface removing substance with the panel surface.

6. The method according to claim 5, wherein said surface removing substance is activated by a heat source, UV radiation or laser beam.

7. The method according to claim 1, wherein said substrate is made of HDF, WPC, polymer composite, engineered polymer, LVT or PVC.

* * * * *